Oct. 24, 1933.  F. R. COOPER  1,931,573

PROCESS OF MAKING AND APPLYING ARTIFICIAL STONE SURFACES

Filed April 11, 1932

Inventor.
Frederick R. Cooper.

Attorney.

Patented Oct. 24, 1933

1,931,573

UNITED STATES PATENT OFFICE 1,931,573

PROCESS OF MAKING AND APPLYING ARTIFICIAL STONE SURFACES

Frederick R. Cooper, Los Angeles, Calif., assignor of one-third to Theodore L. Swoboda, Los Angeles, Calif., and one-third to Charles Steed, Van Nuys, Calif.

Application April 11, 1932. Serial No. 604,494

1 Claim. (Cl. 18—60)

This invention relates to the art of forming and applying artificial stone surfaces simulating the appearance of natural ornamental stone, and particularly ornamental marbles.

Marble is found in nature variously colored, polished surfaces of the stone frequently showing beautiful variegated color effects consisting of a clouded or mottled base, with differently colored veinings often showing as random streaks, or else entirely surrounding blotches of the base colors.

Attempts have been made in the past to form artificial surfaces in imitation of marble, and some effects of certain kinds of marbles have been credibly duplicated. It has not been possible in the past, however, so far as I am aware, to imitate a great many of the characteristic color effects and veinings of natural marbles.

Accordingly, it is a general primary object of the invention to provide a process of producing artificial marble whereby all of the various beautiful color markings of the many types of marbles may be reproduced.

Without going into the details of the prior practices referred to above, it may be stated that such practices have involved blending variously colored cements while in a comparatively wet state, and then after permitting the material to set, it is kept in a moist state for from five to six days during which time it is worked, after which at least five more days are required before the material will dry sufficiently to be finally polished and used.

It is therefore another object of the present invention to provide a method of forming artificial marble, or other stone, wherein the time factor is materially reduced.

The method of the present invention involves the use of combined batches of variously colored cement and water mixtures, the characteristic feature being that said mixtures are dried out by the addition, to initially prepared comparatively wet mixtures, of further dry cement, until the material reaches what may be termed a "semi-dry", comparatively stiff, lumpy consistency. This material is then immediately rolled into sheets of proper thickness, which, due to the semi-dry state of the material, are of a pliable nature and can be picked up on a paper support without cracking. The rolled sheets are picked up and applied to the wall surface, where they are scoured with a wooden float and water, then troweled, and finally allowed to set. In a few hours, or over night, the cement sets sufficiently that it can be finally treated to bring it to a condition ready for final polishing, so that the time for the complete job is a day and a fraction at most.

The invention itself, as well as various additional features and uses, will now be set forth without further preliminary discussion in the following detailed description, reference for this purpose being had to the accompanying drawing in which.

Figure 1:
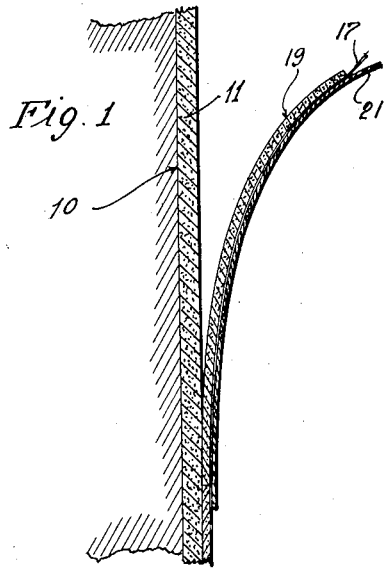
Figure 1 shows a wall surface prepared for the application of my surface layer, and the method of applying the surface layer thereto.

The invention is adaptable to applying the imitation marble surface layer, prepared as hereinafter described, in its unset state directly to walls, to slabs, to molds for production of irregular forms, and to all similar situations. I choose first for illustration, however, the case of applying the surface directly to a wall surface. The first step in this procedure is to prepare the wall surface. In the case of a brick or rough concrete wall, indicated at 10 in Figure 1, the wall is first covered with a base coating 11 of suitable plaster, which is brought to a true surface. After this base coat has set, and just before the mixing of the imitation marble finish layer, the base coat is covered over with a thin coating of some suitable cement which will serve as a bond between the finish layer and the base, and for this purpose I have found Keene's cement to be satisfactory. This coating is then left to partially set while the imitation marble surface layer is prepared.

The surface layer is composed of combined batches of suitably colored cement, or of a suitable plaster, as plaster of Paris. For interior finishes I have found Keene's cement to be highly suitable, although Portland or other cements, plaster of Paris, or other materials may be used. For outside surfaces, Portland cement is preferable because of its weathering durability. Keene's cement, however, is of somewhat finer grade and is considered best wherever it can be used. It may here be stated that the term cement will herein be generically employed to denote any of such materials.

To duplicate a sample of natural colored marble, the colors of the marble are noted, and batches of cement are mixed dry with mineral coloring matter in each of the tints selected. These several batches, each of which contains one of the several selected colors, are each thoroughly mixed with water to a wet, plastic consistency. To give colors between those primarily selected, portions of appropriate batches of wet cement may then be thoroughly mixed together to form additional batches.

Each of the wet batches is then dried out by the gradual addition of more dry cement of the same color mixture, and the batches are thoroughly mixed with the additional dry color-cement until a stiff "semi-dry" consistency is attained. The materials then appear as lumpy, crumbly masses, the lumps being of such stiffness that they do not crush easily.

The variously colored semi-dry batches thus being prepared, the final color blending is then done. For instance, there may have been mixed as above, semi-dry batches tinted respectively with burnt sienna, burnt umber, yellow ocher, red oxide, and drop black, and there may be various batches of combinations of those colors which were mixed while the batches were still wet. A combination of the semi-dry materials of the several batches is then made, proper amounts of each being carefully selected to give the final color balance desired. The amounts of each to be used to reproduce a given sample of marble are of course only to be learned from experience, and considerable artistry must be shown by the operator in this part of the process. This mixed mass is worked together, the differently colored lumps working around one another and blending slightly together. Such admixing is not carried on to the end of a complete blend, however, but is stopped when the differently colored lumps are comparatively uniformly distributed around one another. Thus the color of each of the lumps, although blended at its boundaries, retains its identity in the mixture, so that the final result will give the desired mottled effect. No attempt is made to "pattern" the colors other than to regulate somewhat the sizes of the lumps, the color pattern being left entirely to random distribution.

An effect often required is a colored veining entirely surrounding blotches of the base color. To give this effect, a small amount of the proper colored semi-dry material is sprinkled around and between the lumps of the base-color mixture thus producing, on admixture, individual lumps of material of the mottles in the base color, surrounded by comparatively thin coatings of the selected veining color.

Figure 2:
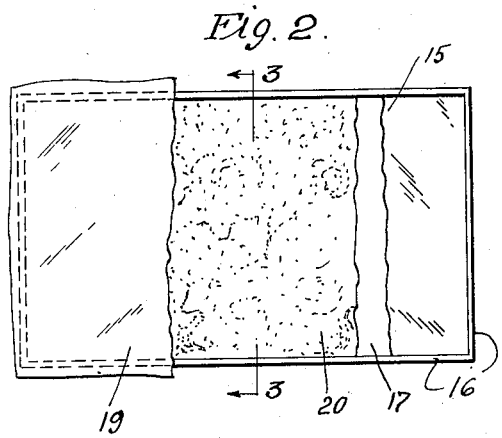
Fig. 2 shows the rolling surface used in rolling out the surface layer.
Figure 3:
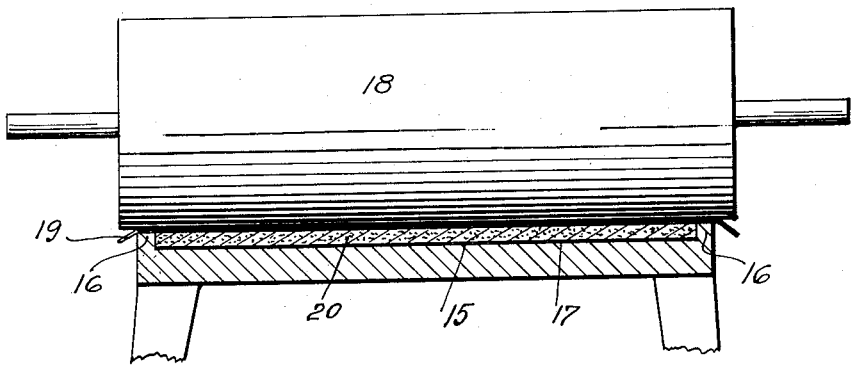
Fig. 3 is a section taken on line 3—3 of Fig. 2, and also showing the use of the roller.

The material is then ready to be spread out and formed into the surface layer. For this part of the process there is provided a plane rolling surface, indicated at 15 in Figs. 2 and 3, having raised edges 16 of a height equal to the thickness of the sheet to be formed, for instance, about three sixteenths of an inch. A layer of a suitable paper or fabric 17, for instance, a layer of ordinary single-ply roofing paper, is laid on this surface inside the raised edges to serve as a backing for the layer to be prepared, and the semi-dry material is then spread on this paper for rolling.

At this time it is possible to add a further effect to the pattern of the imitation marble. Natural marbles often show long streakings of color through the mottled base color, and to reproduce such streakings a portion of the semi-dry material of the color of the streak desired is first placed on the rolling surface in the pattern desired, and the prepared base material then scattered over and around it.

The material is then subjected to pressure, as by being rolled down with a heavy roller 18 to the level of the raised edges 16, the roller being rested on edges 16, as illustrated. A cloth 19 is preferably laid over the surface of the cement during this rolling to prevent the cement adhering to the roller. A levelling rod is used along with this rolling process, being passed over edges 16 to scrape off high spots in the surface, and a steel trowel is used to fill in low spots. In this way, by alternate uses of the roller, and of the leveler and trowel, the material is pressed down and leveled to a smooth plane surface, the lumps of the material being flattened out and pressed together. The heavy rolling compacts the mass, removes air pockets, and produces a thin sheet 20 of fine grain.

The sheet as thus prepared is ready for immediate application to the wall surface, which was prepared as hereinbefore described. The prepared sheet is at this time in a pliable, plastic condition, and can be picked up on its paper backing 17 without cracking. The sheet is therefore immediately picked up, and is laid, paper side down, on a square of flexible board 21, conveniently of paper wall board; this board 21 is used simply for convenience and facility in handling and applying the prepared sheet. The cement bonding coat on the wall, which is still in a somewhat moist condition, is then coated with water, and the prepared sheet 20 is carried on the flexible board 21 to the wall, the surface of the sheet which was uppermost during the rolling process being placed against the wall surface. One edge only of the sheet is first pressed into place against the wall, the board being flexed backwardly to accomplish this, and the sheet is then "rolled" against the wall surface by a progressive flexing movement of the board, as indicated in Fig. 1. By applying the sheet in this manner air is expressed from beneath, and the sheet is stretched smoothly over the wall.

The board 21 is now laid aside and the sheet pressed firmly in place, which for example can be done by running the steel trowel over the paper backing 17. The paper backing is then peeled off, exposing the outer surface of the sheet.

The exposed surface is then rubbed down or scoured for some time with water, using preferably a wooden trowel or float. A steel trowel is used during this process to remove material loosened by the rubbing with the wooden float. The purpose of this rubbing with the float is to grind down into the material so as to expose the cross sections of the lumps making up the surface layer. During this rubbing process, additional of the semi-dry material may be added to fill in any cracks that may develop, and any such added material is worked into the adjacent material with a trowel. The same procedure is used to fill in the joints between successively laid squares of the surface if a continuous marble surface effect is desired; although it is often more desirable to permit the individual squares to appear as individual blocks of marble, in which case the joints will not be thus filled in.

This rubbing down with the float is continued until the material has been ground down sufficiently to expose the cross sections of the individual lumps of the base material as mentioned above. The coloring will not stand out sharply at this time due to the moisture still in the material, but when the material has finally set the cross sections of the lumps will show as variously colored blotches, surrounded and separated by the veining colors, all of course depending upon how the colored materials were selected and distributed. The rubbing with the float is continued, however, until it is ascertained the cross sections of the lumps are exposed.

Immediately after this rubbing down with the float, and before the material has had time to start setting, the material is troweled for several hours with a steel trowel to give a perfectly smooth surface.

The surface is then preferably left over night to harden, after which it may be rubbed over with a comparatively smooth stone, for instance a Scotch hone, to remove any rough spots if needed. The surface may then be coated with a filler such as glue and plaster-of-Paris, which is left on for a few minutes until ie begins to set, and is then well rubbed in. After this filler coat dries the surface may be cleaned in any suitable manner.

The surface then has a very smooth marble-like finish, and the artificially prepared marble pattern stands out sharply. The surface may then be finally finished and polished in any desired manner. I prefer to give it first a rub with linseed oil to set the colors and protect against the final polish, and then to polish with an oxalic acid and alcohol polish.

Figure 4:
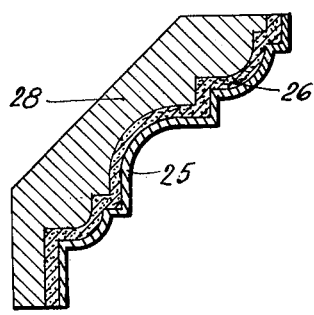
Fig. 4 is an illustration showing how irregular forms are produced by use of a mold.

The present invention also contemplates the application of the prepared semi-dry sheet to molds to produce irregularly shaped forms, as for the purpose of ornamental cornices, columns, etc. Figure 4 shows a mold 25, and the numeral 26 designates the prepared sheet which has been laid face downwardly therein. For instance, the sheet, rolled out as described above, is picked up, its paper backing peeled off, and the surface thus exposed laid face downwardly in the mold. The sheet is then pressed downwardly into the corners of the mold and smoothed, additional material being added and worked into any cracks that may develop. Before the sheet has set, it is backed up with cement to form a suitable base, as indicated at 28, and after the material has set the mold can be removed from the form. In this case the outer surface of the material of course cannot be ground down and polished until the material has set and the mold removed. The surface is therefore finally ground down and polished after the material has set, and this can be done in any manner found suitable.

I have now given in some detail specific instructions for the present preferred practice of the invention for the preparation of my imitation marble surface, and of its application to various situations; it will be appreciated, however, that numerous variations of procedure, as well as additional modes of use, may be found, and it is therefore to be understood that all such variations as come within the broad scope and spirit of my invention are contemplated as lying within the scope of the following claim.

I claim:

The method of preparing artificial stone surfaces, that includes preparing a wet batch of cement, adding dry cement to dry the batch to a stiff lumpy consistency, rolling the material into a layer on a flexible backing sheet resting on a smooth surface, applying a flexible cover sheet over the layer, subjecting the layer to rolling pressure applied through the cover sheet, removing the cover sheet, picking the layer up on the flexible backing sheet and applying its uncovered surface to a suitable base surface, and then removing the backing sheet.

FREDERICK R. COOPER.